(12) United States Patent
Huang

(10) Patent No.: US 7,008,722 B2  
(45) Date of Patent: Mar. 7, 2006

(54) POLYMER-GEL LITHIUM ION BATTERY

(76) Inventor: Sui-Yang Huang, 6336 Singletree Way, Pleasanton, CA (US) 94588

( * ) Notice: Subject to any disclaimer, the term of this patent is extended or adjusted under 35 U.S.C. 154(b) by 464 days.

(21) Appl. No.: 10/313,056

(22) Filed: Dec. 6, 2002

(65) Prior Publication Data

US 2003/0194607 A1 Oct. 16, 2003

Related U.S. Application Data

(60) Provisional application No. 60/380,171, filed on May 6, 2002.

(30) Foreign Application Priority Data

Apr. 10, 2002 (CN) ............................. 02108832 A

(51) Int. Cl.  
  H01M 6/18 (2006.01)  
  H01M 6/24 (2006.01)
(52) U.S. Cl. ............... 429/188; 429/300; 429/304; 429/305; 429/306; 429/129; 429/231.95; 429/156; 29/623.5; 29/623.4
(58) Field of Classification Search ............ 429/156, 429/174, 185, 186, 94, 129; 29/623.5, 623.4
See application file for complete search history.

(56) References Cited

U.S. PATENT DOCUMENTS

| | | |
|---|---|---|
| 5,296,318 A | 3/1994 | Gozdz et al. |
| 5,418,091 A | 5/1995 | Gozdz et al. |
| 5,429,891 A | 7/1995 | Gozdz et al. |
| 5,456,000 A | 10/1995 | Gozdz et al. |
| 5,460,904 A | 10/1995 | Gozdz et al. |
| 5,470,357 A | 11/1995 | Schmutz et al. |
| 5,478,668 A | 12/1995 | Gozdz et al. |
| 5,540,741 A | 7/1996 | Gozdz et al. |
| 5,552,239 A | 9/1996 | Gozdz et al. |
| 5,554,459 A | 9/1996 | Gozdz et al. |
| 5,571,634 A | 11/1996 | Gozdz et al. |
| 5,587,253 A | 12/1996 | Gozdz et al. |
| 5,607,485 A | 3/1997 | Gozdz et al. |
| 5,620,811 A | 4/1997 | Zhang et al. |
| 5,631,103 A | 5/1997 | Eschbach et al. |

(Continued)

OTHER PUBLICATIONS

K. M. Abraham et al., "Ambient Temperature Rechargeable Polymer-electrolyte Batteries", J. Power Sources, 43-44 (1990) 195-208.

(Continued)

*Primary Examiner*—Patrick Joseph Ryan  
*Assistant Examiner*—Angela J. Martin  
(74) *Attorney, Agent, or Firm*—Intellectual Property Law Group LLP; Otto O. Lee; Juneko Jackson

(57) ABSTRACT

An embodiment of the invention is a new method of making a polymer lithium ion battery with low cost, high efficiency and excellent quality. The new polymer lithium ion battery comprises four major components, each of which is a composite: an anode, a cathode, a polymer-gel-electrolyte-separator system and a soft packaging laminate. Adherent particles are introduced into the electrolyte and deposited on the surfaces of both separators and electrodes by Chemical Liquid Deposition (CLD) in-situ the battery cell during the battery assembly process. Those adherent particles not only serve as glue to strongly hold both the anode and cathode together with polyolefin separators, but also form a polymer-gelling electrolyte through the Polymer Gel Formation (PGF) process. The fabrication method creates a self-supporting and self-strengthening battery cell and allows a soft coffee bag laminate to be used as packing shell.

15 Claims, 4 Drawing Sheets

U.S. PATENT DOCUMENTS

| | | | |
|---|---|---|---|
| 5,639,573 | A | 6/1997 | Oliver et al. |
| 5,645,958 | A | 7/1997 | Zhang et al. |
| 5,658,685 | A | 8/1997 | Oliver et al. |
| 5,681,357 | A | 10/1997 | Eschbach et al. |
| 5,688,293 | A | 11/1997 | Oliver et al. |
| 5,705,297 | A | 1/1998 | Warren |
| 5,716,421 | A | 2/1998 | Pendalwar et al. |
| 5,750,284 | A | 5/1998 | Pendalwar et al. |
| 5,759,720 | A | 6/1998 | Amatucci et al. |
| 5,834,135 | A | 11/1998 | Pendalwar et al. |
| 5,837,015 | A * | 11/1998 | Venugopal et al. ........ 29/623.2 |
| 5,840,087 | A | 11/1998 | Gozdz et al. |
| 5,840,371 | A | 11/1998 | Warren |
| 5,849,433 | A | 12/1998 | Venugopal et al. |
| 5,853,916 | A | 12/1998 | Venugopal et al. |
| 5,908,717 | A | 6/1999 | Pendalwar et al. |
| 6,114,068 | A | 9/2000 | Yamada et al. |
| 6,322,923 | B1 * | 11/2001 | Spotnitz et al. ............. 429/144 |
| 6,444,356 | B1 * | 9/2002 | Ma et al. .................... 429/145 |
| 6,815,121 | B1 * | 11/2004 | Dasgupta et al. ........... 429/212 |

OTHER PUBLICATIONS

J. P. Southall et al., "Ionically Conducting Poly (vinylidene flouride) Gel Electrolytes", The Electrochemcal Society Proceeding Series, 345-348. Pennington, NJ (1991).

M. Alamgir et al., "Li Ion Conductive Electrolytes Based on Poly(vinyl chloride)", J. Electrochem. Soc., 140(60): L96-L97 (1993).

K. M. Abraham et al., "Room Temperature Polymer Electrolytes and Batteries Based on Them", Solid State Ionics, 70/71 (1994) 20-26.

C. Lampe-Onnerud et al., "Recent Advances in Bellcore's PliON Battery Technology", Proceeding of the 15$^{th}$ International Seminar & Exhibit on Primary & Secondary Batteries, Fort Lauderdale, FL (1998).

X. Andrieu et al., "Lithium Ion Batteries based on Microporous Gelled Electrolytes", Proceedings of the 15$^{th}$ International Seminar & Exhibit on Primary & Secondary Batteries, Fort Lauderdale, FL (1998).

Y. Araki (Mitsubishi Chemical Co.), "High Capacity Lithium Polymer Batteries for Mobile Devices", Proceeding of the 9$^{th}$ Annual International Conference on Power Requirements for Mobile Computing Wireless Electronic Devices and Business/Consumer Applications, Anaheim, CA, 2001.

H. Watanabe (Sanyo Electric Co.), "Development of Li-Polymer Batteries with Gel Polymer Electrolyte", Proceedings of the 19$^{th}$ Annual International Conference on power Requirements for Mobile Computing, Wireless Electronic Devices and Business/Consumer Applications, Anaheim, CA 2001.

* cited by examiner

POLYMER-GEL LITHIUM ION BATTERY

CROSS-REFERENCE

This application claims foreign priority benefit of China Patent Application No. 02108832.2, filed Apr. 10, 2002, and the benefit of U.S. Provisional Application No. 60/380,171, filed May 6, 2002, which are hereby incorporated herein by reference.

BACKGROUND OF THE INVENTION

The present invention is related to battery electrodes, battery cells and battery lamination processes. The present invention is especially applicable to a method for making a self-supporting and self-strengthening polymer lithium ion battery of low cost, high efficiency and excellent quality.

In the past decade, the work force has been becoming more and more mobile worldwide, simulating high demands for portable consumer electronics such as cellular phones, laptop computers, PDAs, digital cameras, digital camcorders, etc. In addition, the consumer is demanding more reliable and longer-lasting equipment, both of which are determined by the performance of the battery that fuels the mobile applications.

Rechargeable batteries for powering portable electronics have evolved over three generations, from Ni—Cd to Ni—MH and then to Li-ion battery. Gravimetric energy density for each new generation has increased by 50–100%, by associating with new chemistry, materials and technology. Today, the lithium ion battery still dominates the majority of consumer markets, which projects an impressive 40% compound annual growth rate for at least the next five years. In 1994, Bell Communication Research, Inc introduced the polymer lithium ion battery and patented it (U.S. Pat. No. 5,296,318). Since then numerous U.S. patents have issued on polymer, polymeric or polymer-like electrolyte and lithium ion batteries in an attempt to commercialize and mass produce these batteries. Although the polymer lithium ion battery makes no breakthrough in the chemistry of a lithium ion battery, it does show some advantages: flexibility in its design and fabrication, slim size, and light weight. However, these kinds of polymer lithium ion batteries also have some drawbacks:

(1) They are not a pure polymer battery, but a battery mixed with liquid electrolyte in a polymeric matrix. During its fabrication process, there is no formation of either gel, gelling or gel-like electrolyte in the cells. Typically, a polymer separator membrane is formed by casting a solution, that consists of polymer, solvent and dibutyl phthalate (DBP) as plasticizer, on a glass or a plastic substrate such as Teflon and polyester (PET). The membrane is then laminated between the anodes and cathodes at 120–150° C. for a few minutes. After extraction of DBP at 50–85° C. for more than 45 minutes, the polymer membrane becomes a porous separator and will soak liquid electrolyte in the process, known as "activation". Liquid electrolyte remains as a secondary phase and as an immobile fluid in the pores of the polymeric matrix. Therefore, these kinds of polymer lithium ion batteries are not free from problems of leakage and corrosion as described in the above-mentioned patents.

(2) Unlike the multi-layer separator used in traditional wet lithium ion batteries, the polymeric membrane separator in a polymer lithium ion battery has no thermal shutdown mechanism that protects the battery from thermal run-away under abusive conditions. The multi-layer separator in the wet lithium ion battery is typically a microporous trilayer membrane with one polyethylene layer sandwiched between two polypropylene layers, so called "polyolefins". It maintains excellent mechanical strength at elevated temperatures up to its melting point (135–160° C.) where it melts and closes all micropores, resulting in a shutdown of ionic diffusion (internal current). Therefore, when the battery temperature rises to a melting point level in any abusive condition such as overcharge, overdischarge and overheating, the polyolefin separator would block ionic conductance by closing the micropores. The battery cell would have very high internal impedance, which would not allow current to pass through. The temperature would start to cool down, and the battery would be protected from thermal run-away. However, the separator in the polymer battery is a polyvinylidene fluoride (PVDF)-based membrane, having no mechanical strength at elevated temperatures and no thermal shutdown protection. The liquid electrolyte solution in the polymeric matrix of the polymer battery will not be blocked and will continue to carry current when battery temperature rises. For this reason and from a product safety point of view, the polymer lithium ion battery would not be safer than the wet lithium ion battery; in some cases, it may be just the reverse.

(3) The cell of a polymer lithium ion battery is not self-supported, having little mechanical strength. The battery would easily swell and be deformed, as the outer package is a soft bag with laminated metallized plastic.

(4) The larger internal impedance causes poorer performance at both low temperature and after high temperature storage. Due to electrolyte immobilization in a polymeric membrane, a necessary function of cell construction, safety and dimensional flexibility in a polymer lithium ion battery is a reduction in ion transport rate. This generally results in larger internal impedance than that in a wet lithium ion battery. The consequences of larger internal impedance are deterioration in discharge capability, especially at low temperatures, and recycling efficiency, particularly under conditions of use after elevated temperature storage conditions.

(5) Polymer lithium ion batteries have high production costs due to slow fabrication processes and low yield rate. Productivity of polymer lithium ion batteries is lower than that of wet lithium ion batteries, due to slower processes such as the DBP extraction process above-mentioned and bi-cell stacking process. The lower production yield rate is mainly due to difficulty in control of homogeneity of membrane thickness, electrode loading, adhesion between electrodes and polymer membrane for the large area of laminated electrodes.

Another approach to make a polymer lithium ion battery proposes to coat the microporous polyolefins separator, prior to the electrodes/separator lamination process, with a layer of a bonding paste comprising gelling polymer having an electrolyte active species. However, in the following assembly processes, the occurrence of delamination or separation of the electrodes from the coated separators is detrimental. This normally results in a low production yield rate, poor quality, and inconsistency of battery performance. The main cause is difficulty in control of the coating separator with a bonding paste that comprises electrolyte solution. Solvent or co-solvents in the electrolyte solution are so volatile that it is almost impossible to handle the coating process in open-air operations to get a high quality layer on the separator. The surface density and gelling degree of paste layers would vary a lot, depending upon the coating speed, formulation of bonding paste, environmental temperature, and the surface area of coating being exposed to atmosphere.

Therefore, there is a need for a new method that is innovative, simple, reliable, highly productive and cost-effective to be used for making a polymer lithium ion battery with high quality and consistent performance.

SUMMARY OF THE INVENTION

An object of the present invention is to solve the foregoing problems and to provide a method for making a polymer lithium ion battery with high quality and consistent performance. In an embodiment of the invention, a method is disclosed that describes how to make an adherent polymer gel electrolyte in-situ battery cell during battery assembly process, fabrication of a self-strengthening battery cell, final battery seal and lamination. The polymer-gel electrolyte/separator system is a core component in the polymer lithium ion battery. In order to form a gelling-polymer electrolyte with excellent adhesion between separator and electrodes, adherent particles are introduced into electrolyte solution and deposited on surfaces of both separators and electrodes during battery assembly process. This process in an embodiment of the present invention is called Chemical Liquid Deposition (CLD). Surface density of the adherent particles is in the range of about 0.02–0.4 mg/cm$^2$, with a preferred range of about 0.1–0.2 mg/cm$^2$. In the next curing process step, a gel-polymer electrolyte is formed around polyolefin separators, and an adherent layer is formed on the surfaces of both polyolefin separators and electrodes. This process in an embodiment of the present invention is called Polymer Gel Formation (PGF) process. The battery cell thus made is self-supporting and self-strengthening. A soft laminated film can be used as the package; the battery will have no swelling and deformation.

These and other embodiments of the present invention are further made apparent, in the remainder of the present document, to those of ordinary skill in the art.

BRIEF DESCRIPTION OF THE DRAWINGS

In order to more fully describe embodiments of the present invention, reference is made to the accompanying drawings. These drawings are not to be considered limitations in the scope of the invention, but are merely illustrative.

DETAILED DESCRIPTION OF SPECIFIC EMBODIMENTS

The description above and below and the drawings of the present document focus on one or more currently preferred embodiments of the present invention and also describe some exemplary optional features and/or alternative embodiments. The description and drawings are for the purpose of illustration and not limitation. Those of ordinary skill in the art would recognize variations, modifications, and alternatives. Such variations, modifications, and alternatives are also within the scope of the present invention. Section titles are terse and are for convenience only.

Figure 1:
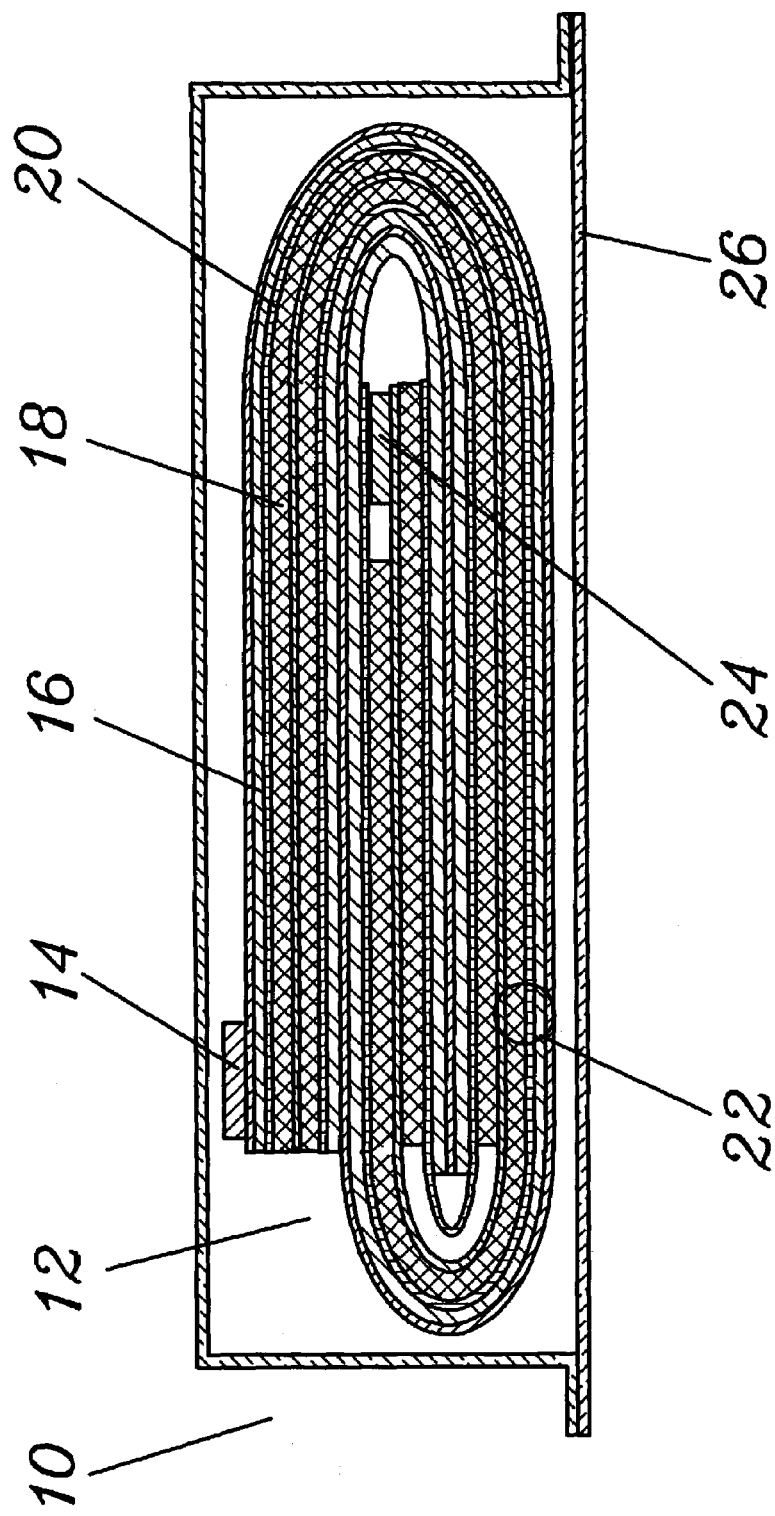
FIG. 1 is a cross-sectional view of the polymer-gel battery with a multi-layered jellyroll, which is a self-supporting cell, surrounded by a soft package, according to an embodiment of the invention.

Referring now to FIG. 1, there is a battery 10. Battery 10 consists of the jellyroll 12, comprising negative electrodes 16, positive electrodes 18, and an electrolyte/separator system 20 therebetween; and finally, a soft package bag 26. The jellyroll inside the soft package bag is also referred to as the battery cell.

The negative electrode 16, normally called an anode, is a composite, which may be fabricated by coating anode slurry on Cu foil or grid as substrate and current collector. The composite anode consists of active materials, polymeric or rubber-like binders, and sometimes conducting carbon black. The active materials may be one or a combination of lithium host compounds such as carbon, petroleum coke, activated carbon, graphite, and other carbonaceous materials such as carbon fibers or graphite fibers.

The positive electrode 18, referred to as a cathode, is also a composite, which may be fabricated by coating cathode slurry on Al foil or grid as substrate and current collector. The composite cathode consists of active materials, polymeric binders, and conducting carbon black or graphite. The active materials may be one or a combination of lithium intercalation compounds such as $LiCoO_2$, $LiNiO_2$, $LiMn_2O_4$ and their doped solid solution $Li_\alpha Ni_\beta Co_\delta M_\gamma O_2$ (M=Mn, Al, Ti, Mg and Cr etc.).

Figure 2:
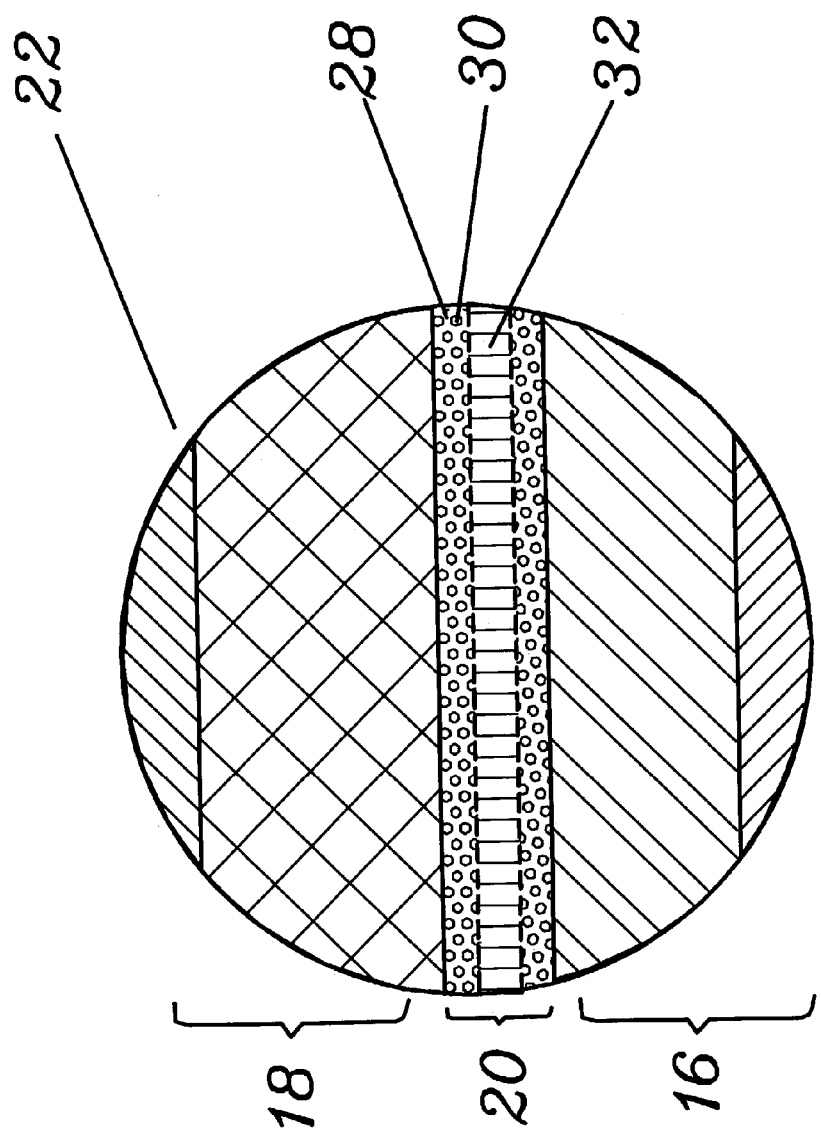
FIG. 2 is an enlarged cross section of battery electrodes, adherent particles, electrolyte, and separators shown in FIG. 1.

Referring now to the electrolyte/separator system 20, it is again a composite. Its enlargement is shown in FIG. 2 as the enlarged cross section 22 of FIG. 1. Like anodic and cathodic composite electrodes, the electrolyte/separator system 20 comprises of active materials (gel electrolyte 28) mixed with polymeric binder (adherent polymer particles 30) deposited on a microporous membrane 32 as a substrate. The multi-layer microporous membrane 32 refers to any microporous membrane that may be made from polyolefins, including but not limited to, polyethylene (PE), polypropylene (PP) and polymethylpentene (PMP). They are commercially available from these sources: Tonen Tapyrus Corporation (Tokyo, Japan), Asahi Chemical Industry Co. Ltd. (Tokyo, Japan), Ube Industries (Tokyo, Japan), Nitto Denko K. K. (Osaka, Japan), and Celgard LLC, (NC, USA). Polymeric binder particles serve as an adhesive between the microporous membrane and two electrodes. They include, but are not limited to, polyvinylidene fluoride (PVDF), polyurethane, polyethylene oxide (PEO), polyacrylate, polyacrylonitrile (PAN), polymethylacrylate (PMA), polyacrylamide, polyvinylacetate, polyvinylpyrrolidone, and copolymers such as PVDF:HFP (HFP: hexafluoropropylen).

The solvent is typically chosen to fully or partially dissolve the polymers or copolymers. Exemplary solvents include, but are not limited to, acetone, dimethyl carbonate, dimethyl formamide, dimethyl phthalate, methyl ethyl ketone, n-methyl-2-pyrrolidinone, propylene carbonate, propylene glycol ethyl ether, and tetrahydrofuran. The concentration of polymer in the solvent may vary from 0.01–80% by weight, depending on solubility and application. Surface density of adherent polymeric particles is in the range of 0.02–0.4 mg/cm$^2$, preferred 0.1–0.2 mg/cm$^2$. It has been noticed that adding polymer(s) into solvent(s) may not always result in a perfect solution, but sometimes result in a partially dissolved polymer suspension, due to poor solubility of polymer(s) in solvent(s). However, if residual particles or suspension particles are small enough (less than 3 μm) to fill into gaps between separators and electrodes, the suspension will be good enough to be used as polymer fluid. Both polymer solution and partially dissolved polymer suspension are referred to as P-fluid.

In another embodiment, in cases where adherent particles are deposited with a high range of surface density, (i.e. greater than 0.25 mg/cm$^2$), a plasticizer such as dibutyl phthalate (DBP) is added into the P-fluid. On the high side of surface density, the adherent particles tend to form a compact and continuous layer between polyolefin separators and electrodes. This layer would block lithium ionic diffusion. The addition of DBP into the P-fluid would create a necessary porosity and increase lithium ionic conductivity in the polymer electrolyte/separator composite system.

The active materials in the electrolyte/separator composite system are gel electrolytes, which are formed during the PGF process from a gelling reaction between adherent polymer particles and liquid electrolyte. The electrolyte active species consists of a lithium metal salt in a co-solvent. Typical lithium salts include, but are not limited to, salts having the formula LiX, where X is an anion such as $ClO_4^-$, $BF_4^-$, $PF_6^-$, $AsF_6^-$, $SbF_6^-$, $CH_3CO_2^-$, $CF_3SO_3^-$, $N(CF_3SO_2)_2^-$, $C(CF_3SO_2)_2^-$ and combinations thereof. Exemplary solvents include, but are not limited to, propylene carbonate (PC), ethylene carbonate (EC), diethyl carbonate (DEC), dimethyl carbonate (DMC), ethylmethyl carbonate (EMC), and γ-butrylactone (GBL). The concentration of lithium salt(s) in electrolyte ranges from 0.5–1.5M. The solution of electrolyte active species is also referred to as E-solution. The gel electrolyte provides ionic conductivity between the anode and the cathode, and also adhesion between microporous separators and electrodes.

Referring to the metallized plastic package 26 and electrode leads 14 and 24 in FIG. 1, the former provides a water and atmosphere barrier to the battery cell, and the latter provides current connection between battery cell and outer electronic devices. The metallized package refers to any multi-layer barrier laminate, such as polyester/adhesive laminate/Al/polyethylene and polyester/ethylene acrylic acid adhesive laminate (EM)/Al/EAA/polyester/polyethylene/EAA. The core issue here is to make a leakage-proof seal on the laminate edges and also between the electrode leads and laminate. Any tiny leakage from sealed sections would cause battery performance failure, swelling, corrosion, and safety concerns. Both package laminate and electrode leads with seal adhesive are commercially available, for example, from Sumitomo Electric Industries, Ltd. (Tokyo, Japan).

Figure 3:
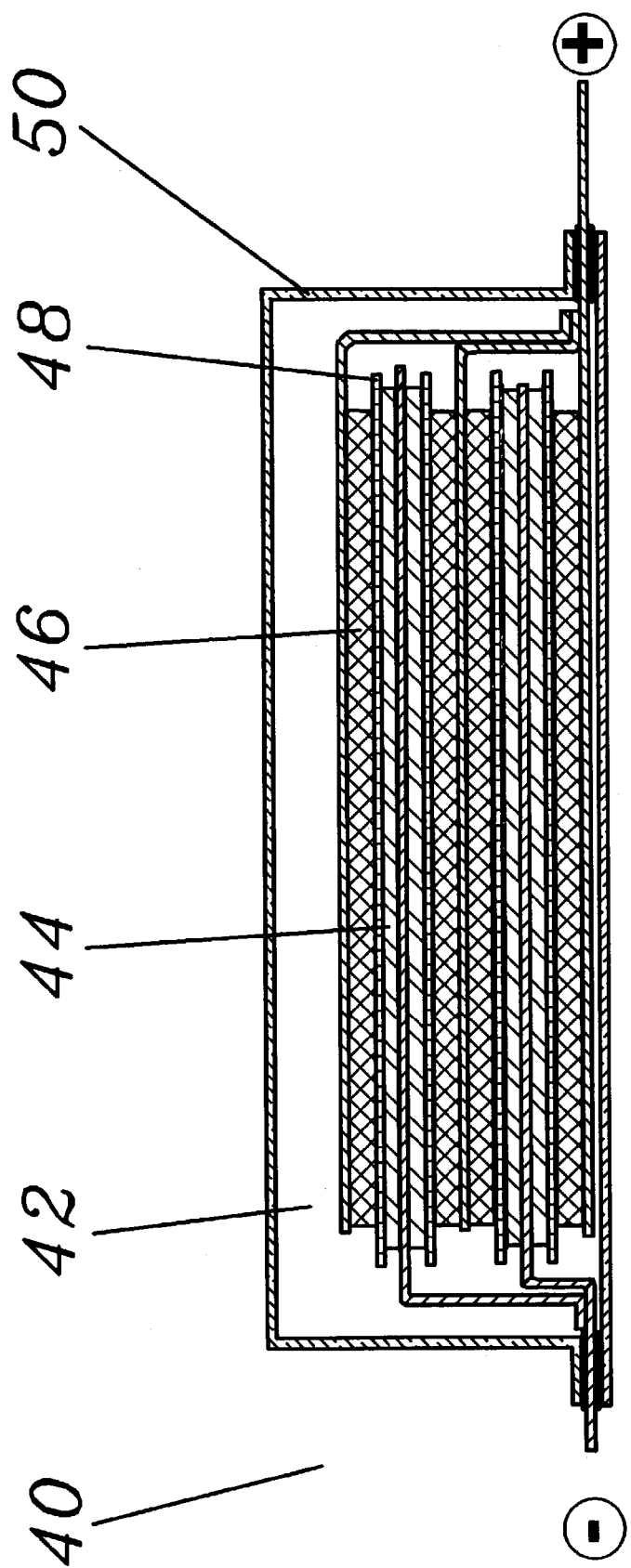
FIG. 3 is a cross-sectional view of the polymer-gel battery with stacked electrodes and soft package, according to an embodiment of the invention.

Referring now to FIG. 3, there is illustrated therein a cross-sectional view of polymer-gel battery 40 with stacked cell 42. The battery comprises a negative electrode 44, a positive electrode 46, an electrolyte/separator system 48, and a soft package 50, according to the invention. Unlike a jellyroll cell, a stacked cell has its electrode/separator plates overlying each other. The lamination of the electrode/separator may end up with two different configurations: the first is ending with two cathodes having one sided coating as outer electrodes as shown in FIG. 3; the second is ending with two anodes having one sided coating as outer electrodes. The advantages of stacked cell versus jellyroll cell are lower internal impedance and higher power density. Its disadvantages are more handling for electrode leads and electrodes/separators stacking, resulting in lower productivity and higher cost.

The process to make a battery comprises the following steps:

(1) Coating an anode with the mixture of above mentioned anode ingredient and solvent, then calendering and vacuum drying.

(2) Coating a cathode with the mixture of above mentioned cathode ingredient and solvent, then calendering and vacuum drying.

(3) Winding both anode and cathode along with two polyolefin separators into a jellyroll as battery cell, in the configuration of anode/separator/cathode/separator, as shown in FIG. 1.

(4) Alternatively, stacking anode, separator and cathode plates into a battery cell, as described in the FIG. 3.

(5) Inserting the battery cell into pre-formed metallized plastic bag with three sealed edges.

(6) Injecting pre-mixed electrolyte into the bag. The electrolyte is a mixture of P-fluid and E-solution; the details are given below:

P-fluid: polymer solution with a concentration ranging from 0.01% to 80%

E-solution: electrolyte solution with 8%–16% lithium salt.

Ratio between P-fluid and E-solution is PF:ES=0.05–0.17.

After injection of mixed electrolyte into the battery cell, a vacuum drying will be applied to the package for a few minutes to evacuate low vapor pressure solvent in P-fluid and the filling edge will then be hot sealed. During solvent evacuation from P-fluid, pre-dissolved or partially dissolved polymer will re-crystallize from the fluid to form micro-particles. This process is defined as Chemical Liquid Deposition (CLD). In the next curing process, heating the micro-particles at 60–160° C. under pressure 5–100 PSI for a time period of 5–3000 seconds will create adhesion between polyolefin separators and electrodes to bond them together, as well as react with E-solution to form polymer-gel electrolyte. This process is defined as Polymer Gel Formation (PGF) process.

(7) Alternatively, another way of the conducting CLD and PGF processes is after injection of P-fluid into the package bag that holds a battery cell, vacuum drying the package for a few minutes to evacuate solvent in the fluid at a warm temperature of 40–80° C. During solvent evacuation, pre-dissolved or partially dissolved polymer will re-crystallize from the fluid to form micro-particles. E-solution will then be injected into the bag and the open edge will finally be sealed. Heating the micro-particles at 60–160° C. under a pressure of 5–100 PSI for a time period of 5–3000 seconds, micro-particles will create adhesion between the polyolefin separators and electrodes to bond them together, as well as react with E-solution to form polymer-gel electrolyte.

(8) Forming the battery. Charging the finished battery to 4.2V at low C-rate such as C/5 for initiation, conditioning of the battery and formation of passivation layers on the anode.

The advantages of the battery making process disclosed in this invention are simple, efficient, low cost and high quality, in comparison with the art of prior technologies. Neither PVDF coating nor bonding paste coating, (which contain an active electrolyte), on polyolefin separators are necessary prior to the battery assembly process. Both adherent particles and polymer-gel electrolyte are formed in-situ the battery cell, directly onto the surfaces of separators and electrodes during battery assembly. The P-fluid solvent filled into the battery cell that was packaged inside a bag, would first freshen the surfaces of both separator and electrodes. Next polymer micro-particles would be re-crystallized from the P-fluid and deposited on the refreshed surfaces of both separator and electrodes. Evacuation of the solvent is under control through the vacuum drying process. Therefore, the contact between the polymer particles and the refreshed surfaces is intimate, and the adhesion between separator and electrodes is ensured, the quality of battery cell is enhanced, and the consistency of battery performance would be achieved. The battery cell thus made would be self-strengthened and self-supported without the need for mechanical support from a rigid package shell. The problems such as delamination or separation of electrodes from separators, swelling and deformation of battery cell, and inconsistency of lamination quality are minimized.

Figure 4:
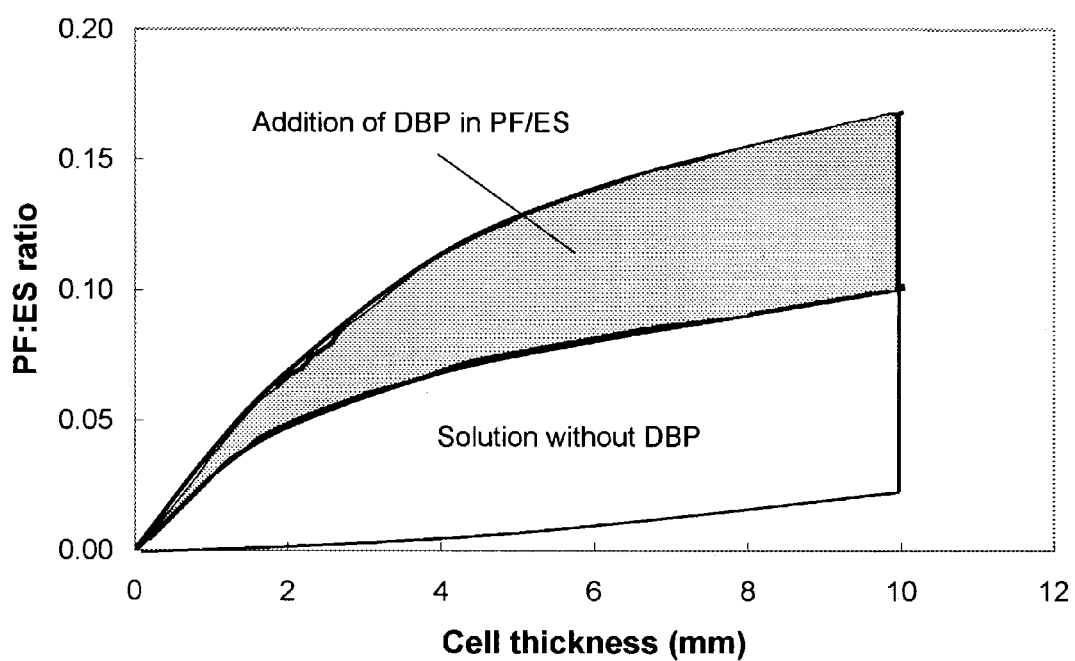
FIG. 4 shows the relationship between polymer solution/electrolyte active species solution ratio and thickness of the battery cell with and without the addition of dibutyl phthalate.

Referring now to FIG. 4, shows the relationship between the PF/ES ratio versus thickness of battery cell. In order to enhance adhesion between separators and electrodes, and also to form polymer gel electrolyte, the PF/ES ratio does not remain constant but slightly increases as a function of cell thickness. For each thickness of battery cell, the PF/ES ratio may vary upon surface density of adherent particles, physical-chemical properties of polymers, and the CLD-PGF processing condition. On the high range of surface density of adherent particles, i.e. greater than 0.25 mg/cm$^2$, the adherent particles are so dense that they tend to form a continuous and compact layer without pores. Therefore, a plasticizer, such as phthalate-based ester (typically DBP), is recommended to add into P-fluid or mixed PF-ES solution to create necessary porosity in the layer. The amount of DBP in the PF-ES solution may vary from 5% to 40%, the higher the surface density, the larger the amount of DBP needed in the solution.

The invention may be better understood from three specific embodiments of which are attached hereto.

EXAMPLE 1

A 100 mAh jellyroll cell was built by folding electrodes/separators three times, as shown in FIG. 1. Compositions of the anode, cathode, separator, P-fluid and E-solution are given below.

Anode: 89% graphite (MPG form Mitsubishi Chemicals), 11% PVDF (Kynar 2801 from Elf-Atochem). Current collector is Cu foil (20 $\mu$m thickness). Loading is 12 mg/cm$^2$.

Cathode: 88% LiNi$_{0.8}$Co$_{0.17}$Al$_{0.03}$O$_2$ (CA2003 from Fuji Chemical), 5% carbon black (Super S from MMM), 7% PVDF (Kynar 2801 from Elf-Atochem). Current collector is Al foil (30 $\mu$m thickness). Loading is 21 mg/cm$^2$.

Separator: polyolefin microporous membrane (Celgard 2300 from Celgard USA).

P-fluid: 3.5% PVDF (Kynar 2801 from Elf-Atochem) in acetone/PC (20:80).

E-solution: 1.2M LiPF6 in EC/DEC/DMC (25:45:30).

Package bag: Soft Packaging Film from Sumitomo Electric Industries.

Active materials of the anode and cathode were mixed separately with n-methyl-2-pyrrolidone (NMP) and coated onto the Cu and Al foils, respectively, by using Doctor Blade, then dried at temperature of 120° C. After coating, the electrodes were calendered to such a thickness that 30% porosity remains in both anode and cathode. Cu and Al tabs were welded to the uncoated area of the current collectors for the anode and cathode, respectively. After placing the electrodes and the separator in the configuration of anode/separator/cathode/separator, the laminated electrode/separator bend was folded three times as shown in FIG. 1. The jellyroll cell was placed into a package bag with three edges sealed, leaving one edge open. Then the packaged cell was vacuum dried overnight at a temperature of 90° C. After drying, the P-fluid was injected first into the cell and then extra solvent was evacuated under vacuum for a time period of 4 minutes. At the second filling step, the E-solution was injected into the cell, and the open edge was finally sealed.

In the last assembly process, the cell was cured under pressure of 15 PSI for 5 minutes at temperature of 98° C. A gel-forming polymer electrolyte and an excellent adhesion between both electrodes and separators were established during this process. The battery cell thus made is rigid. Finally, the finished battery was formed by charging to 4.2V for 8 hrs.

EXAMPLE 2

An 80 mAh stacked cell was built by laminating electrodes/separators together as shown in FIG. 3. Compositions of the anode, cathode, separator, P-fluid and E-solution are given below.

Anode: 90% graphite (GDA01 from Mitsui Mining Material Company), 10% PVDF (Kynar 2801 from Elf-Atochem). Current collector is Cu foil (20 $\mu$m thickness). Loading is 15 mg/cm$^2$.

Cathode: 88% Li$_\alpha$Ni$_\beta$Co$_{67}$ Mn$_\gamma$O$_2$ (R&D sample), 5% carbon black (Super S from MMM), 7% PVDF (Kynar 2801 from Elf-Atochem). Current collector is Al foil (30 $\mu$m thickness). Loading is 27 mg/cm$^2$.

Separator: polyolefin microporous membrane (Celgard 2500 from Celgard USA).

P-fluid: 2.8% PVDF (Kynar 2801 from Elf-Atochem) in MEK/PC (30:70).

E-solution: 1.2M LiPF6 in EC/EMC/DMC (30:50:20).

Package bag: Soft Packaging Film from Sumitomo Electric Industries.

Active materials of the anode and cathode were mixed separately with n-methyl-2-pyrrolidone (NMP) and coated onto the Cu and Al foils, respectively, by using Doctor Blade, then dried at temperature of 120° C. After coating, the electrodes were calendered to such a thickness that 30% porosity remains in both anode and cathode. Cu and Al tabs were welded to the uncoated area of the current collectors for the anode and cathode, respectively. The electrodes and the separator were placed in the flat configuration of cathode/separator/anode/separator as a single unit; three units were laminated together into a stacked cell, as shown in FIG. 3. The stacked cell was placed into a package bag with three edges sealed, leaving one edge open. Then the packaged cell was vacuum dried overnight at a temperature of 90° C. After drying, a mixture of P-fluid and E-solution was injected into the cell, and then extra solvent was evacuated under vacuum for 2 minutes. Finally, the open edge was sealed.

In the last assembly process, the cell was cured under pressure of 10 PSI for 5 minutes at a temperature of 98° C. A gel-forming polymer electrolyte and an excellent adhesion between both electrodes and separators were established during this process. The battery cell thus made is rigid. Finally, the finished battery was formed by charging to 4.2V for 8 hrs.

EXAMPLE 3

A 100 mAh stacked cell was built by laminating electrodes/separators together. Compositions of the anode, cathode, separator, P-fluid and E-solution are given below.

Anode: 90% graphite (SLA1020 from Superior Graphite Co.), 10% PVDF (Kynar 2801 from Elf-Atochem). Current collector is Cu foil (20 $\mu$m thickness). Loading is 13 mg/cm$^2$.

Cathode: 88% $LiCoO_2$ (from FMC USA), 5% carbon black (Super S from MMM), 7% PVDF (Kynar 2801 from Elf-Atochem). Current collector is Al foil (30 $\mu$m thickness). Loading is 29 mg/cm$^2$.

Separator: polyolefin microporous membrane (Celgard 2500 from Celgard USA).

P-fluid: 10% PVDF (Kynar 2801 from Elf-Atochem) and 4% DBP (from Aldrich) in acetone/PC (50:50).

E-solution: 1.2M LiPF6 in EC/EMC/DEC (30:45:25).

Package bag: Soft Packaging Film from Sumitomo Electric Industries.

Active materials of the anode and cathode were mixed separately with n-methyl-2-pyrrolidone (NMP) and coated onto the Cu and Al foils, respectively, by using Doctor Blade, then dried at a temperature of 120° C. After coating, the electrodes were calendered to such a thickness that 30% porosity remains in both anode and cathode. Cu and Al tabs were welded to the uncoated area of the current collectors for the anode and cathode, respectively. The electrodes and the separator were placed in the flat configuration of cathode/separator/ anode/separator as a single unit; three units were stacked together into a battery cell, as shown in FIG. 3. The stacked cell was placed into a package bag with three edges sealed, leaving one edge open. Then the packaged cell was vacuum dried overnight at a temperature of 90° C. After drying, a mixture of P-fluid and E-solution was injected into the cell, and then extra solvent was evacuated under vacuum for 2 minutes. Finally, the open edge was sealed. In the last assembly process, the cell was cured under pressure of 10 PSI for 5 minutes at temperature of 98° C. A gel-forming polymer electrolyte and an excellent adhesion between both electrodes and separators were established during this process. The battery cell thus made is rigid. Finally, the finished battery was formed by charging to 4.2V for 8 hrs.

Throughout the description and drawings, example embodiments are given with reference to specific configurations. It will be appreciated by those of ordinary skill in the art that the present invention can be embodied in other specific forms. Those of ordinary skill in the art would be able to practice such other embodiments without undue experimentation. The scope of the present invention, for the purpose of the present patent document, is not limited merely to the specific example embodiments of the foregoing description, but rather is indicated by the appended claims. All changes that come within the meaning and range of equivalents within the claims are intended to be considered as being embraced within the spirit and scope of the claims.

What is claimed is:

1. A method of making a rechargeable polymer lithium ion battery comprising the steps of:
    (a) forming a battery cell using a negative electrode, positive electrode and separator element and placing the battery cell into a soft package film element, wherein said electrodes each have a plurality of surfaces and the separator element is a microporous membrane, having a plurality of sides;
    (b) depositing adherent particles from a P-fluid element on to the surfaces of the electrodes and sides of the separator element and having electrolyte from an E-solution element absorbed in to micropores of the electrodes and separator element during battery assembly process;
    wherein said P-fluid element is a polymer fluid to deposit adherent particles onto separators, which will bond both anode and cathode onto the separators; and
    wherein said E-solution element is a liquid electrolyte solution, comprising lithium salts and solvents to form polymer gelling electrolyte;
    (c) performing a chemical liquid deposition (CLD) wherein the step of depositing adherent particles comprises the steps of:
        i) introducing the polymer fluid (P-fluid) into the packaged battery cell;
        ii) extracting solvent from the P-fluid under a vacuum at a temperature of about 25–80° C. for a time period of about 5–500 seconds to recrystallize polymer from the P-fluid into particles, wherein said particles are characterized by:
            a. a particle size in the range of about 0.01–5 $\mu$m;
            b. a surface density in the range of about 0.01–0.4 mg/cm$^2$;
    wherein the CLD process self-strengthens and self-supports the battery cell; and
    (d) curing the battery in the soft package film element resulting in a packaged battery cell.

2. The method according to claim 1, wherein the separator element is a multi-layer microporous membrane.

3. The method according to claim 1, wherein the soft package film element comprises a multi-layered metal plastic laminate.

4. The method according to claim 1, wherein said negative and positive electrodes are sandwiched with microporous separators therebetween and further wound into a jellyroll cell or stacked into a flat cell.

5. The method according to claim 1, further comprising performing a polymer gel formation (PGF) comprising the steps of:
    i) filling the packaged battery cell with a solution of electrolyte active species (E-solution) after said CLD process;
    ii) curing said packaged battery cell by heating at a temperature of about 40–160° C. for a time period of about 10–3000 seconds under pressure of about 5–100 PSI per each cell;
wherein the PGF process self-strengthens and self-supports the battery cell.

6. The method according to claim 1, wherein said negative electrode element is made of carbonaceous materials, selected from the group consisting of graphite, carbon black, petroleum coke, activated carbon, nano carbon tubes, carbon fibers and graphite fibers.

7. The method according to claim 1, wherein said negative electrode element is fabricated from non-carbonaceous materials, selected from the group consisting of metal oxides, alloys and intermetallic compounds.

8. The method according to claim 1, wherein said positive electrode element is made from lithium intercalation compounds, selected from the group consisting of lithium-based oxides, sulfides, phosphate, chlorides and fluorides.

9. The method according to claim 1, wherein said separator element is a thermal shutdown separator, having a porosity ranging from about 25% to 65% and a thickness ranging from about 3 to about 100 $\mu$m.

10. The method according to claim 1, wherein said P-fluid is either a solution or a suspension of polymer selected from the group of
  polyethylene (PE), polypropylene (PP), polymethylpentene (PMP), polyvinylidene fluoride (PVDF), polyethylene oxide (PEO), polyurethane, polyacrylate, polyacrylonitrile, polymethylacrylate, polyacrylamide, polyvinylacetate, polyvinylpyrrolidone, and copolymers such as PVDF:hexafluoropropylen (HFP) or of any of the foregoing, and combinations thereof;
  dissolved or dispersed in solvent(s) selected from the group consisting of: styrene, acetone, acetonitrile, dimethyl carbonate, dimethyl formamide, dimethyl phthalate, methyl ethyl ketone, n-methyl-2-pyrrolidinone, propylene carbonate, propylene glycol ethyl ether, and terahydrofuran,
  wherein a single polymer, co-polymer, or their combination is dissolved or dispersed into the single solvent, co-solvents or combinations thereof, having a concentration ranging from 0.01% to 80% in weight, a particle size ranging from 0 to 10 $\mu$m, and a state of liquid ranging from solution to suspension.

11. The method according to claim 10, wherein said P-fluid further comprises a dibutyl phthalate content ranging from 0.01% to 40%, as a plasticizer, especially, when adherent particles that are deposited on polyolefin separators reach a high range of surface density greater than 0.25 mg/cm$^2$.

12. The method according to claim 1, wherein the lithium salts of the E-solution are selected from the group consisting of $ClO_4^-$, $BF_4^-$, $PF_6^-$, $AsF_6^-$, $SbF_6^-$, $CH_3CO_2^-$, $CF_3SO_3^-$, $N(CF_3SO_2)_2^-$, $C(CF_3SO_2)_2^-$ and combinations thereof.

13. The method according to claim 2, wherein the solvents of the E-solution are selected from the group consisting of propylene carbonate, ethylene carbonate, diethyl carbonate, dimethyl carbonate, $\gamma$-butrylactone, dimethyl sulfoxide, dimethoxyethane, tetrahydrofuran, sulfolane and combinations thereof.

14. The method according to claim 1, wherein said soft package film is selected from multi-layered metallic plastic laminates, containing Al barrier.

15. A lithium ion battery manufactured according to claim 1, with a self-supporting and self-strengthening cell, and soft packaging laminate.

* * * * *